United States Patent [19]
Wolff et al.

[11] Patent Number: 4,933,436
[45] Date of Patent: Jun. 12, 1990

[54] PROCESS FOR THE PREPARATION OF STABLE AQUEOUS SOLUTIONS OF ANIONIC DYESTUFFS BY CONDUCTING DIAZOTIZATION IN THE PRESENCE OF AN AROMATIC SULPHONIC ACID

[75] Inventors: Joachim Wolff, Bergisch Gladbach; Karl-Heinz Wolf, Leverkusen; Reinhold M. Klipper, Cologne, all of Fed. Rep. of Germany

[73] Assignee: Bayer Aktiengesellschaft, Leverkusen, Fed. Rep. of Germany

[21] Appl. No.: 7,229

[22] Filed: Jan. 27, 1987

[30] Foreign Application Priority Data

Jan. 29, 1986 [DE] Fed. Rep. of Germany ....... 3602524

[51] Int. Cl.$^5$ .................... C07C 113/04; C09B 67/26; D06P 1/06
[52] U.S. Cl. .................................... 534/581; 534/558; 534/565; 534/887; 534/632; 534/583
[58] Field of Search ................ 534/581, 558, 565, 583

[56] References Cited
U.S. PATENT DOCUMENTS
4,035,350  7/1977  Landler et al. ..................... 534/581

FOREIGN PATENT DOCUMENTS
2448994  4/1976  Fed. Rep. of Germany ...... 534/581

Primary Examiner—Floyd D. Higel
Attorney, Agent, or Firm—Sprung Horn Kramer & Woods

[57] ABSTRACT

Azo dyes are obtained by diazotizing an aromatic amine and combining the resulting diazonium salt solution with a sulpho-containing coupling component when the sole acid donor used for the diazotization reaction—instead of the otherwise customary mineral or fatty acids—is a low molecular weight, nonsurfactantlike aromatic sulphonic acid.

9 Claims, No Drawings

PROCESS FOR THE PREPARATION OF STABLE AQUEOUS SOLUTIONS OF ANIONIC DYESTUFFS BY CONDUCTING DIAZOTIZATION IN THE PRESENCE OF AN AROMATIC SULPHONIC ACID

The invention relates to a process for preparing storable concentrated aqueous solutions of anionic azo dyestuffs, in particular anionic azo-reactive dyestuffs.

The use of dyestuff solutions in place of the hitherto customary dyestuff powders has in recent years become more and more important, since they offer some convincing advantages over the conventional formulations: avoidance of dust problems, easy meterability, good and rapid distribution in the application medium and the attendant immaculate dyeing results.

Such liquid formulations should contain at least 10% by weight of pure dyestuff and be maintainable without change over extended periods even at temperatures around the freezing point.

However, this requirement is normally not met by the dyestuff acid sodium salts hitherto used in the powder brands.

It has therefore already been proposed (cf. for example No. EP-A-43,927) to prepare, instead of the sodium salts, the generally more soluble lithium salts through suitable choice of the synthesis conditions.

But even the solutions prepared therefrom were not fully satisfactory in storability.

Good results are provided in this respect also by diverse membrane separation processes described in the literature (cf. for example Nos. EP-A-59,782, -114,031 and -126,830 and also No. GB-A-2,015,018), which, however, are very time-consuming and costly.

It has now been found, surprisingly, that concentrated solutions of anionic azo dyes are obtained in a comparatively simple manner by diazotizing an aromatic amine and combining the resulting diazonium salt solution with a sulpho-containing coupling component when the sole acid donor used for the diazotization reaction— instead of the otherwise customary mineral or fatty acids—is a low molecular weight, nonsurfactantlike aromatic sulphonic acid.

The use of such sulphonic acids in the preparation of azo dyestuffs by diazotizing and coupling is not new per se.

However, hitherto these acids were exclusively used for other purposes.

According to Houben-Weyl X/3, page 19, for example xylenesulphonate is used in the presence of hydrochloric acid for analytical and preparative purposes in the diazotization of certain amines.

According to Nature 1956, page 1069, arylsulphonic acids are used to prepare benzene-soluble solid diazonium salts.

It is further known from No. DE-A-2,448,994 to prepare azo pigments by diazotizing and coupling in the presence of aromatic sulphonic acids.

It has in addition already been proposed (cf. No. DE-A-2,607,122) to use, as the sole acid in the diazotization and coupling, "dispersing agent acids", by which are understood higher molecular weight condensation products of formaldehyde and aromatic sulphonic acids. In this way it is also said to be possible to prepare azo dyestuff solutions, which, however, is not correct. In fact, even if water-soluble coupling components are used, the electrolyte character of the dispersing agent acids is responsible for producing dispersions—as indeed the name already implies.

It is finally known from No. DE-A-2,503,714, -2,503,791 and -2,656,503 to use, as the sole acid donor in the preparation of low-salt azo dyestuffs, the sulpho-containing diazo and/or coupling components.

However, this process is not universally applicable and, even in those cases where it works, it provides contaminated end products owing to undesirable secondary reactions.

Against that, the arylsulphonic acids to be used according to the invention are universally applicable, leading to products of high purity.

The acids used in the processing according to the invention are preferably those of the benzene, naphthalene and diphenyl series.

Examples which may be mentioned are: benzenesulphonic and benzenedisulphonic acids, toluenesulphonic acids, xylenesulphonic acids, diphenylsulphonic acids, naphthalenesulphonic and naphthalenedisulphonic acids.

The diazotization is preferably carried out in an aqueous or aqueous-organic medium, at temperatures of $-20°$ to $+50°$ C. In special cases, even a purely organic medium can be advisable.

In general, the organic sulphonic acids are used in at least stoichiometric amounts, i.e. at least one equivalent of acid per mole of salt of nitrous acid.

The requisite 2nd equivalent of acid for diazotization reaction can be provided by an ion exchanger carrying acid groups.

This ion exchanger can be not only an inorganic but also an organic solid cation exchanger.

Suitable organic ion exchangers based on synthetic resin are for example those in bead or granulate form, or strongly acid macroporous or gellike bead polymers based on crosslinked polystyrene which carry sulphonic acid groups. Also suitable are bead polymers based on polystyrene where the styrene nuclei can be substituted by the following groups:

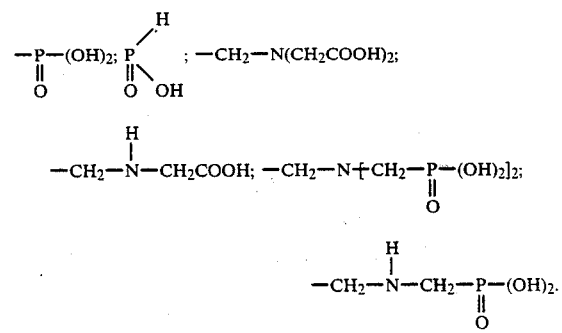

It is also possible to use weakly acid cation exchangers with COOH groups in bead or granulate form, but preferably in bead form. This includes cation exchangers based on crosslinked acrylic acid or crosslinked methacrylic acid and also crosslinked and subsequently hydrolyzed maleic anhydride. The crosslinking agents used therein are polyvinylaromatics, preferably divinylbenzene, octa-1,7-diene and hexa-1,5-diene alone or their combinations with divinylbenzene.

Also suitable are ion exchangers which have acid groups and can be prepared by condensation reactions. They include polycondensates of phenol or phenol derivatives with formaldehyde, of ring-sulphonated aromatics (phenolic acids or naphthalenesulphonic acids) with formaldehyde, and also such products as are prepared by simultaneous reaction of HCHO, sodium sulphite and phenol.

Also suitable are carboxyl-containing condensation resins which are prepared by reacting HCHO with, for example, 1,3,5-resorcylic acid or by reacting HCHO with phenoxyacetic acid, resorcinol-O-acetic acid or analogous compounds.

Also suitable are weakly acid resins which have been prepared by condensing phenol or resorcinol with formaldehydes. In addition to the synthetic organic cation exchangers, it is also possible to use inorganic cation exchangers as solid acids. They include in particular the large class of zeolite minerals or the class of glaukonites (greensands). The zeolites include, inter alia, mordenite (Ca, $K_2$, $Na_2$) [Al $Si_5O_{12}]_2$x6.6$H_2O$ and natrolite $Na_2[Si_3Al_2O_{10}]$x2$H_2O$.

A large number of cation exchangers of the type mentioned are commercially available and described in the literature; cf. for example Ullmann's Enzyklopädie d. Technischen Chemie [Encyclopaedia of Chemical Technology], 4th edition, volume 13, page 279-346.

The process according to the invention is suitable not only for diazotizing aromatic amines without ionic groups but also amines with ionic groups, in particular sulphonic acid groups.

This diazotization can be effected directly or indirectly. In the one process variant, the procedure is preferably such that a dispersion or solution of the aromatic amine in water is diazotized with an alkali metal or alkaline earth metal nitrite in the presence of the at least equivalent amount of a low molecular weight sulphonic acid and of the equimolar amount of a cation exchanger, the nitrous acid necessary for the diazotization being formed from the $H^+$ ions of the organic acid and spontaneously through contact of the nitrite salt with the cation exchanger. In the indirect process variant, the aromatic amine in water has added to it at pH 6-12, preferably 6-9, the amount of nitrite compounds which is necessary for the diazotization, and this mixture is added to a suspension of the ion exchanger and of the aromatic sulphonic acid, and diazotization sets in spontaneously. Possible nitrite compounds are preferably $LiNO_2$ and organic nitrites.

When ion exchangers are used, the salts of watersoluble acid formed in the course of the diazotization reaction, in particular the alkali metal or alkaline earth metal salt, is removed in a simple manner by sieving or filtration, either immediately after the diazotization or, however, after the subsequent coupling to give the azo dyestuff.

When using organic nitrites, the diazotization is, more advantageously, preferably carried out without addition of ion exchangers in the presence of at least 2 moles of aromatic sulphonic acid.

The diazotization is followed in conventional manner by the reaction with the coupling components, preferably in the presence of inorganic or organic basic compounds as acid acceptors, and also, if desired, in the presence of water-miscible organic solubilizers, hydrotropic compounds, buffer substances and/or nonionic dispersing agents.

If desired, the solubilizers, hydrotropic compounds and dispersing agents mentioned can also be added earlier to the diazotization mixture.

Suitable basic compounds for the coupling are those whose cation leads to an improvement in the solubility of the dyestuff, preferably basic Li compounds (such as LiOH, $Li_2CO_3$) and primary, secondary, tertiary or quaternary amines (in particular mono-, di- and trialkanolamines or the corresponding ethoxylated or propoxylated derivatives, morpholine or ammonium hydroxide).

Suitable water-miscible organic compounds and/or hydrotropic compounds are for example monohydrate or polyhydrate alcohols, low molecular weight ethers, glycol ethers, water-soluble aliphatic or cyclic amides, lactams, preferably ε-caprolactam or N-alkylpyrrolidones, and/or lower aliphatic sulphoxides and/or sulpho-containing compounds such as dimethyl sulphone, sulpholane and/or derivatives which are substituted in the α- and β-position and/or hydrotropic compounds such as urea and its derivatives, particularly preferably N,N-dimethylurea and/or mixtures with amines such as triethylamine, triethanolamine.

In the case of preparing solutions of reactive dyestuffs, eligible compounds are of course only those which are not capable of any reaction with the reactive groups which might reduce the tinctorial strength, for example ε-caprolactam, N-methylpyrrolidone, dicyanodiamide, dimethyl sulphone and/or N,N-dimethylurea.

On working with ion exchangers in the diazotization phase and using basic lithium compounds in the coupling, the results obtained directly and without intermediate isolation of the dyestuffs are stable concentrated solutions having a very low sodium ion content. When amines or ammonium compounds are used, the resulting solutions of azo dyestuffs are practically free from alkali metal or alkaline earth metal ions.

Preferably the solutions prepared by the new process contain in addition to water:
10-35% by weight of dyestuff,
0-30% by weight of organic solubilizers and/or hydrotropic compounds and/or dispersants,
0-3% by weight of buffer substances,
1-20% by weight of salts of low molecular weight organic aromatic sulphonic acids.

Particular preference is given to highly concentrated dyestuff solutions having a dyestuff content of 12-35% by weight.

The new process is suitable in particular for preparing low-salt or salt-free formulations of concentrated aqueous solutions of reactive dyestuffs.

To reactive dyestuff formulations are generally added buffer substances for the pH range 4.5-8.5, for example boric acid, phosphate and hydrogencarbonate buffer. The solution can be dried in conventional manner, if desired after addition of customary standardizing agents, for example by spray-drying. This gives low-salt powder or granulate formulations.

Particularly suitable reactive dyestuffs are those of the formula:

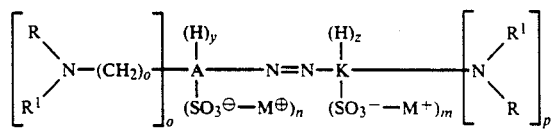

in which
A = radical of the diazo component,
K = radical of the coupling component, $M^+ = H$, Li, Na, $NH_4$ or $N(R^2)_4$, where $R^2$ = alkyl, in particular optionally OH substituted $C_1-C_4$ alkyl or $-(R^3O)_t$-H with $R^3 = C_2-C_3$-alkyl and t=2-5, R = reactive radical, $R^1$ = hydrogen or alkyl ($C_1-C_4$), m,n = whole number from 0-6, where n+m=1-6, p,q=q=0 or 1, where p+q=1 or 2, o=1 to 4, y,z=0 or 1, where y+z=1 or 0 and where q+y=1, also p+z=1.

Reactive radicals R are to be understood as meaning those which have one or more reactive groups or detachable substituents which, under dyeing conditions in the presence of acid-binding agents, are capable of reacting with the hydroxyl groups of cellulose or the NH groups of natural or synthetic polyamides to form covalent bonds.

Suitable reactive groups which contain at least one detachable substituent bonded to a heterocyclic radical are, inter alia, those which contain at least one reactive substituent bonded to a 5- or 6-membered heterocyclic ring, such as a monazine, diazine, triazine, for example pyridine, pyrimidine, pyridazine, thiazine, oxazine or asymmetrical or symmetrical triazine ring, or to such a ring system which has one or more fused-on rings, such as a quinoline, phthalazine, cinnoline, quinazoline, quinoxaline, acridine, phenazine and phenanthridine ring systems; the 5- or 6-membered heterocyclic rings which have at least one reactive substituent are accordingly preferably those which contain one more nitrogen atoms and can contain 5- or preferably 6-membered fused-on carbocyclic rings.

Examples which may be mentioned of reactive substituents on the heterocycle are:

halogen (Cl, Br or F), azido(—$N_3$), thiocyanato, thio, thiolether, oxyether.

Preference is given in the case of the present invention to reactive dyestuffs having reactive groups based on the following systems: monohalogeno- or dihalogeno-symmetrical triazinyl radicals, mono-, di- or trihalogenopyrimidinyl radicals or halogen-substituted quinoxalinylcarbonyl radicals. Particular preference is given to the following active groups of the formulae (2), (3) and (4):

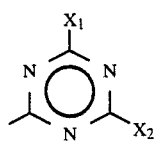
(2)

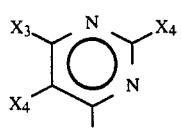
(3)

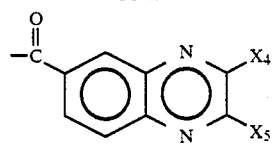
(4)

where in the formulae (2), (3) and (4):

$X_1 = F$, $X_2 = Cl, F, NH_2, NHR^2, OR^2, CH_2R^2, SR^2m$ $X_3 = Cl, F, CH_3$, $X_4 = Cl, F$ and $X_5 = Cl, F, CH_3$ and where $R^2$ = alkyl (in particular optionally OH—, $SO_3H$ or COOH-substitutes $C_1-C_4$ alkyl), aryl (in particular optionally $SO_3H$—, $C_1-C_4$-alkyl-, $C_1-C_4$-alkoxy-substituted phenyl), aralkyl (in particular optionally $SO_3H$—, $C_1-C_4$-alkyl-, $C_1-C_4$-alkoxy-substituted benzyl).

Dyestuffs which contain the abovementioned reactive group systems are for example known from the following publications: U.S. Pat. Nos. 3,377,336 and 3,527,760, British Patent No. 1,169,254, U.S. Pat. No. 3,669,951, German Patent No. 1,644,208, British Patent No. 1,188,606, German Offenlegungsschrift No. 2,817,780 and Spanish Patent No. 479,771.

The non-heterocyclic reactive radicals are for example β-chlorethylsulphonyl, β-acetoxyethylsulphonyl, β-sulphatoethylsulphonyl, β-thiosulphatoethylsulphonyl, β-sulphatoethylsulphonylmethylamino, and vinylsulphonylmethylamino groups.

The products obtained by the process according to the invention find many and varied utility, for example for preparing dyebaths or print pastes for dyeing natural and synthetic substrates, in particular cotton, wool, regenerated cellulose, paper and leather.

EXAMPLE 1

1 mole of 1-amino-(4-aminobenzoyl)-8-hydroxy-3,6-napthalenedisulphonic acid is reacted in 2200 ml of water with LiOHx$H_2O$ at pH 4.5 with 1.05 moles of 2,4,6-trifluoro-5-chloropyrimidine at 10° C. 1 moles of aminobenzene-2-sulphonic acid is dissolved in 600 ml of water with LiOHx$H_2O$ under neutral conditions. Addition of 800 ml of a strongly acid gellike cation exchanger based on crosslinked polystyrene and having a capacity of 2 moles of $SO_3H$ groups per liter and 0.8 mole of p-toluenesulphonic acid is followed by diazotization with 1 mole of 30% strength $NaNO_2$ solution at 5° C. On completion of the diazotization the mixture is added at 10° C. to the coupling component, while the coupling pH is contained at pH 6 by adding a condensation product of triethanolamine with moles of ethylene oxide. After coupling has taken place, 700 g of ε-caprolactam and 1000 ml of water are added. Removal of the exchanger resin by filtration leaves a concentrated solution which contains 15% of the reactive dyestuff of the formula (5), relative to free acid.

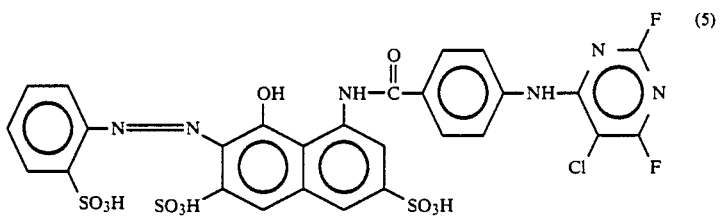

Using the process of German Offenlegungsschrift No. 3,228,339 (diazotization in 2 moles of $H_2SO_4$ and coupling with 2 moles of $CaCO_3$) merely gives a suspension of reactive dyestuff (5).

EXAMPLE 2

1 mole of the monosodium salt of 1-amino-(4-aminobenzoyl)-8-hydroxy-3,6-naphthalenedisulphonic acid is reacted in 2200 ml of water with LiOHx$H_2O$ and pH 4.5 with 1.05 moles of 2,4,6-trifluoro-5-chloropyrimidine at 10° C. 1 mole of aminobenzene-2-sulphonic acid is dissolved in 600 ml of water with LiOHx$H_2O$ under neutral conditions. Addition of 800 ml of a strongly acid gellike cation exchanger based on crosslinked polystyrene and having a capacity of 2 moles of $SO_3H$ groups per liter and 0.8 mole of p-toluenesulphonic acid is followed by diazotization with 1 mole of 30% strength $NaNO_2$ solution at 5° C. On completion of the diazotization the mixture is added at 10° C. to the coupling component, while the coupling pH is contained at pH 6 by adding a condensation product of triethanolamine with 3 moles of ethylene oxide. After coupling has taken place, 700 g of ε-caprolactam and 1000 ml of water are added. Removal of the exchanger resin by filtration leaves a concentrated solution which contains 15% of the reactive dyestuff of the formula (5), relative to free acid.

EXAMPLE 3

1 mole of 1-amino-8-hydroxy-4,6-naphthalenedisulphonic acid is dissolved in 460 ml of water with LiOHx$H_2O$ under neutral conditions and reacted with sodium hydroxide solution (400 g/l) at pH 8.5 and 10° C. with 1.10 moles of 2,4-difluoro-5-chloro-6-methylpyrimidine.

1 mole of 1-aminobenzene-2-sulphonic acid is suspended in 920 ml of water, and 2.2 moles of p-toluenesulphonic acid are added. At 5° C. 1 mole of 30% strength sodium nitrite solution is added. After the diazotization has ended, coupling is brought about with the solution, prepared as described above, of the condensation product of 1-amino-8-hydroxynaphthalene-3,6-disulphonic acid with 2,4-difluoro-5-chloro-6-methylpyrimidine. During the coupling, the pH is maintained at 6 with LiOHx$H_2O$ as in. Addition of 1000 ml of purified water and 460 g of N,N-dimethylurea gives a concentrated solution which contains 12% of the reactive dyestuff. Adding this concentrated reactive dyestuff solution to water together with the auxiliaries customary for reactive dyeing gives a preparation for dyeing and printing natural and regenerated cellulose fibre in a red hue.

EXAMPLE 4

1 mole of 2,4-diaminobenzenesulphonic acid is dissolved in 690 ml of water with LiOHx$H_2O$ and reacted with 1.05 moles of 2,4-difluoro-5-chloro-6-methylpyrimidie. To the condensation products are added 2.3 moles of p-toluenesulphonic acid, and the suspension is diazotized at 5° C. with 1 mole of lithium nitrite solution. After the diazotization has ended, coupling is effected at 5° C. with a solution of the coupling component which has been prepared as described hereinafter. The pH during the coupling is maintained at 8.5 with LiOHx$H_2O$. The coupling is prepared as follows:

1 mole of 1-amino-2,5-benzenedisulphonic acid is suspended in 250 ml of water and 2.2 moles of p-toluenesulphonic acid. This is followed at 5° C. by diazotization with 1 mole of lithium nitrite solution and, after the diazotization has ended, by coupling with dimethyl acetosuccinate at 5°-20° C. A pH of 5 is set with 0.3 mole of sodium acetate solution and 1.7 moles of sodium hydrogen carbonate. Raising the pH to 8.5 with LiOHx$H_2O$ is followed by cyclization at 60° C. 1 mole of LiOHx$H_2O$ is added to effect hydrolysis at the same temperature. After the hydrolysis has ended, 600 g of ε-caprolactam are added. A solution of the coupling component is obtained. Coupling with diazotized condensation product gives a concentrated solution which contains 16.5% of reactive dyestuff.

EXAMPLE 5

2 moles of p-toluenesulphonic acid are added at 0° C. to a suspension of 1 mole of N-(4-aminophenyl)-acetamide, 200 ml of water and 1 mole of ethyl nitrite. After the diazotization has ended, 1 mole of aniline and 2 moles of p-toluenesulphonic acid are added. 1 mole of ethyl nitrite is used to diazotize at 0° C., and the product is subsequently coupled to 1 mole of 7,7'-(carbonyldiimino)-bis-4-hydroxy-2-naphthalenesulphonic acid. The coupling pH is maintained at 7.5 with methyldiethanolamine. This gives a solution which contains 12% of the dyestuff.

We claim:

1. In a process for the preparation of a concentrated aqueous solution of an anionic azo dyestuff comprising diazotizing an aromatic amine in the presence of an acid and coupling the resulting diazonium salt onto a sulpho-containing coupling component, the improvement wherein the diazotization is carried out in the presence of a low molecular weight, nonsurfactant-like, aromatic sulphonic acid wherein said sulphonic acid is a monosulphonic or polysulphonic acid of benzene, toluene, xylene, diphenyl or naphthalene.

2. A process according to claim 1, wherein said sulphonic acid is selected from the group consisting of benzenesulphonic acid, benzenedisulphonic acids, toluene-sulphonic acids, xylenesulphonic acids, diphenylsulphonic acids, naphthalenesulphonic acid and naphthalenedisulphonic acids.

3. A process according to claim 1, wherein the sulphonic acid is p-toluenesulphonic acid.

4. A process according to claim 1, wherein a solid cation exchanger which contains acid groups is used in addition to the sulphonic acid.

5. A process according to claim 1, wherein LiNO$_2$ or an organic nitrite is used in the diazotization reaction.

6. A process according to claim 4, wherein the solid cation exchanger is a strongly acid resin based on polystyrenesulphonic acids or polycondensates of phenol/formaldehyde.

7. A process according to claim 4, wherein at least one equivalent of sulphonic acid and one equivalent of the cation exchanger based upon the amount of nitrite is used.

8. A process according to claim 1, wherein the concentrated aqueous solution contains
   10-35% by weight of anionic dyestuff, and
   1-20% by weight of salts of said low molecular weight aromatic sulfonic acid.

9. A process according to claim 1, wherein said anionic azo dyestuff is a azo-reactive dyestuff.

* * * * *